(12) United States Patent
Setomoto et al.

(10) Patent No.: US 10,110,865 B2
(45) Date of Patent: Oct. 23, 2018

(54) LIGHTING DEVICE, LIGHTING SYSTEM, AND PROGRAM

(71) Applicant: Panasonic Intellectual Property Management Co., Ltd., Osaka (JP)

(72) Inventors: Tatsumi Setomoto, Osaka (JP); Kentaro Yamauchi, Hyogo (JP)

(73) Assignee: PANASONIC INTELLECTUAL PROPERTY MANAGEMENT CO., LTD., Chuo-Ku, Osaka-Shi, Osaka (JP)

( * ) Notice: Subject to any disclaimer, the term of this patent is extended or adjusted under 35 U.S.C. 154(b) by 12 days.

(21) Appl. No.: 15/248,433

(22) Filed: Aug. 26, 2016

(65) Prior Publication Data

US 2017/0070712 A1 Mar. 9, 2017

(30) Foreign Application Priority Data

Sep. 4, 2015 (JP) .................. 2015-175061

(51) Int. Cl.
*H04N 9/31* (2006.01)
*H04N 5/222* (2006.01)
*H04N 13/00* (2018.01)
*H04N 13/02* (2006.01)

(52) U.S. Cl.
CPC ......... *H04N 9/3182* (2013.01); *H04N 5/2226* (2013.01); *H04N 13/0271* (2013.01)

(58) Field of Classification Search
USPC ....... 348/744, 750, 759, 725, 724, 719, 714, 348/706, 592, 383, 382, 333.1, 182, 136, 348/70, 50, 49, 48, 47, 46, 42, 34, 345, 348/272, 223.1, 224.1; 382/106, 162, 382/173, 174, 195, 211
See application file for complete search history.

(56) References Cited

U.S. PATENT DOCUMENTS

| | | | | |
|---|---|---|---|---|
| 6,088,470 | A * | 7/2000 | Camus ................. | G06K 9/0061 351/207 |
| 2005/0146716 | A1 * | 7/2005 | Dixon .................. | G01N 21/278 356/237.4 |
| 2006/0092298 | A1 * | 5/2006 | Ishiga .................... | H04N 9/045 348/272 |
| 2007/0052836 | A1 * | 3/2007 | Yamada ............. | H04N 5/23212 348/345 |
| 2009/0040533 | A1 * | 2/2009 | Takahashi .......... | G01B 11/2522 356/612 |

(Continued)

FOREIGN PATENT DOCUMENTS

JP 04-150493 A 5/1992
JP 2000-123614 A 4/2000
(Continued)

*Primary Examiner* — Michael E Teitelbaum
(74) *Attorney, Agent, or Firm* — Renner, Otto, Boisselle & Sklar, LLP (57) ABSTRACT

A lighting device includes: a receiving circuit which obtains a first image including a subject; a memory which obtains depth information indicating a depth of the subject in the first image; an image processor which converts the first image obtained, into a second image in which the subject in the first image is represented by gradation of a single color, the gradation being different according to the depth indicated by the depth information; a light source; a light modulator which modulates light emitted from the light source, according to the second image; and a light emitter which emits the modulated light.

11 Claims, 11 Drawing Sheets

(56) References Cited

U.S. PATENT DOCUMENTS

| | | | | |
|---|---|---|---|---|
| 2009/0195670 A1* | 8/2009 | Koishi | G06T 15/50 | 348/223.1 |
| 2009/0226092 A1* | 9/2009 | Kuroda | G06T 7/136 | 382/190 |
| 2010/0194919 A1* | 8/2010 | Ishii | H04N 5/2354 | 348/224.1 |
| 2010/0195122 A1* | 8/2010 | Kritchman | B29C 67/0059 | 358/1.9 |
| 2011/0229040 A1* | 9/2011 | Thakkar | G06T 7/00 | 382/190 |
| 2013/0004082 A1* | 1/2013 | Kano | G06T 5/002 | 382/195 |
| 2013/0107005 A1* | 5/2013 | Lim | H04N 5/33 | 348/46 |
| 2014/0031628 A1* | 1/2014 | Kaku | A61B 1/00009 | 600/178 |
| 2014/0063358 A1* | 3/2014 | Kegasawa | H04N 9/3167 | 349/9 |
| 2014/0079288 A1* | 3/2014 | Lee | G06T 5/00 | 382/106 |
| 2014/0300701 A1* | 10/2014 | Park | H04N 13/0271 | 348/46 |
| 2014/0362188 A1* | 12/2014 | Yokokawa | A63F 13/42 | 3/42 |
| 2015/0067554 A1* | 3/2015 | Lee | G06T 11/00 | 715/765 |
| 2015/0289345 A1* | 10/2015 | Lee | H05B 37/0218 | 315/153 |
| 2016/0295088 A1* | 10/2016 | Umetsu | H04N 5/2256 | |

FOREIGN PATENT DOCUMENTS

| | | |
|---|---|---|
| JP | 2001-215115 A | 8/2001 |
| JP | 2009-129795 A | 6/2009 |
| JP | 2010-134363 A | 6/2010 |

* cited by examiner

FIG. 11

LIGHTING DEVICE, LIGHTING SYSTEM, AND PROGRAM

CROSS REFERENCE TO RELATED APPLICATION

This application claims the benefit of priority of Japanese Patent Application Number 2015-175061 filed on Sep. 4, 2015, the entire content of which is hereby incorporated by reference.

BACKGROUND

1. Technical Field

The present disclosure relates to a lighting device, a lighting system, and a program, for emitting light modulated according to an image.

2. Description of the Related Art

A lighting device such as a projector, which is capable of modulating light according to an image or a moving picture and emitting the light, is conventionally known (for example, Japanese Unexamined Patent Application Publication No. 2010-134363). Such a lighting device modulates light emitted from a light source, for example, by causing the light to pass through a transmissive imaging element.

SUMMARY

When light modulated using an image is used as illuminating light, there is a difficulty in generating light suitable for illumination while maintaining a feature of an original image.

The present disclosure provides a lighting device, a lighting system, and a program, which are capable of generating, using an image, light suitable for illumination.

A lighting device according to an aspect of the present disclosure includes: a receiving circuit which obtains a first image including a subject; a memory which obtains depth information indicating a depth of the subject in the first image; an image processor which converts the first image obtained, into a second image in which the subject in the first image is represented by gradation of a single color, the gradation being different according to the depth indicated by the depth information; a light source; a light modulator which modulates light emitted from the light source, according to the second image; and a light emitter which emits the modulated light.

A lighting system according to an aspect of the present disclosure includes the lighting device and the imaging device.

A program according to an aspect of the present disclosure is for causing a computer to execute processes performed by the image processor included in the lighting device.

The lighting device, the lighting system, and the program according to an aspect of the present disclosure are capable of generating, using a moving picture, light suitable for illumination.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

A lighting device and a lighting system according to embodiments will be described below with reference to the drawings. It should be noted that the embodiments described below show general or specific examples. The numerical values, shapes, materials, structural components, the arrangement and connection of the structural components, steps, the processing order of the steps etc. described in the following embodiments are mere examples, and therefore do not limit the scope of the present disclosure. Therefore, among the structural components in the following embodiments, structural components not recited in any one of the independent claims are described as arbitrary structural components.

In addition, each of the diagrams is a schematic diagram and thus is not necessarily strictly illustrated. In each of the diagrams, substantially the same structural components are assigned with the same reference signs, and there are instances where redundant descriptions are omitted or simplified.

Embodiment 1

[Overview]

Figure 1:
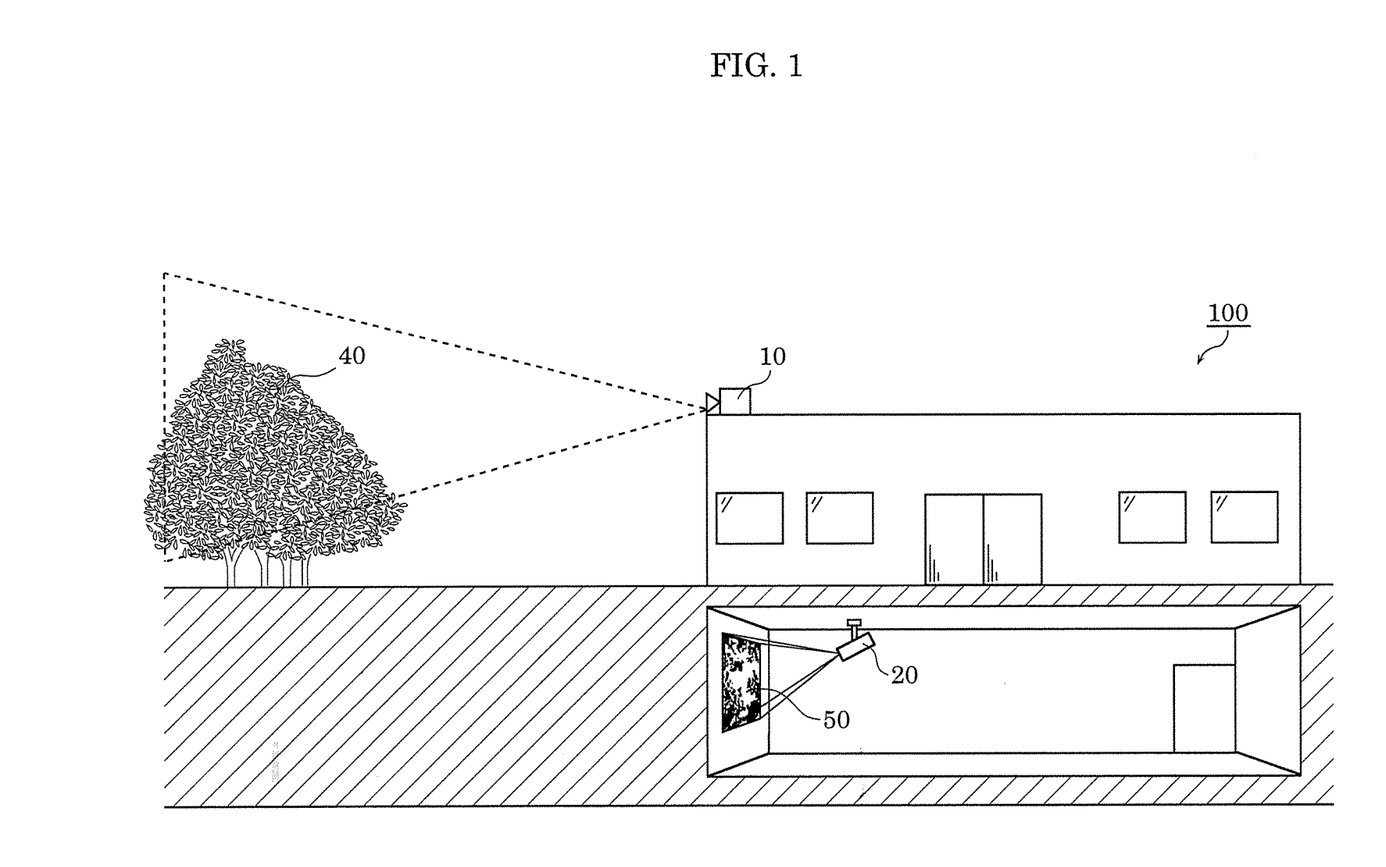
FIG. 1 is a diagram illustrating an overall configuration of a lighting system according to Embodiment 1.

The following describes an overview of a lighting system according to Embodiment 1. FIG. 1 is a diagram illustrating an overall configuration of the lighting system according to Embodiment 1.

As illustrated in FIG. 1, lighting system 100 includes imaging device 10 and lighting device 20. Imaging device 10 is placed outdoors, for example, and lighting device 20 is placed indoors, for example. Imaging device 10 and lighting device 20 are connected to each other via a communication network (communication network 30 (FIG. 3) which will be described later), and capable of communicating with each other.

Imaging device 10 images subject 40 such as a tree. Imaging device 10 transmits a moving picture (video) including subject 40, to lighting device 20. The moving picture includes a plurality of temporally consecutive images (still images).

Lighting device 20, upon receiving the images included in the moving picture, performs image processing on the images, and emits illuminating light 50 modulated according to the images on which image processing has been performed. Lighting device 20 emits illuminating light 50 on a real-time basis every time lighting device 20 receives an image (frame). In this manner, a user of lighting device 20 can obtain, on a real-time basis, illuminating light 50 (light distribution pattern) having the same or similar feature of subject 40 imaged by imaging device 10. Illuminating light 50 may be used for indirect lighting or for direct lighting.

Lighting system 100 is capable of providing illuminating light 50 having a feature of subject 40 located outdoors, to an indoor space (e.g., an underground space) as illustrated in FIG. 1, for example. More specifically, lighting system 100 is capable of providing illuminating light 50 having a feature of subject 40 located outdoors, for a hospitalized patient who cannot go out. In addition, lighting system 10 can be used in a museum or for a ceremony.

Figure 2:
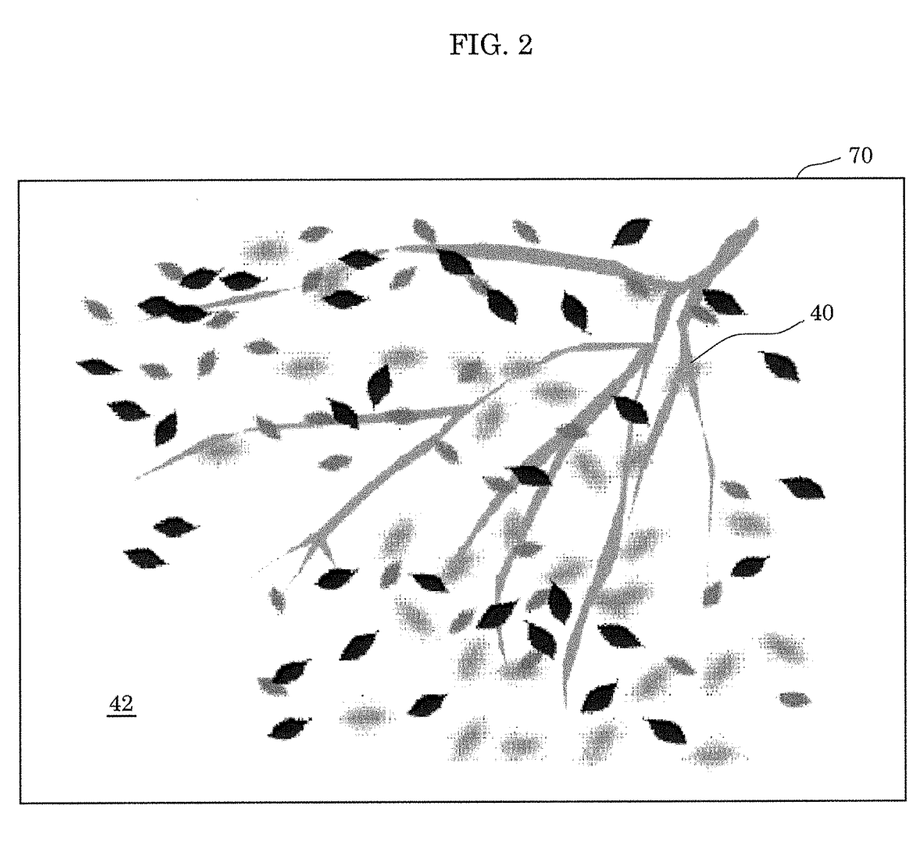
FIG. 2 is a schematic diagram for explaining an image generated by (i.e., illuminating light emitted by) a lighting device according to Embodiment 1.

It should be noted that, in the following embodiments, a tree is imaged as subject 40, and lighting device 20 performs image processing on an image of the tree to generate image 70 which imitates sunlight filtering through leaves as illustrated in FIG. 2, and emits illuminating light 50 modulated according to image 70 (i.e., illuminating light 50 similar to image 70). FIG. 2 is a schematic diagram for explaining an image generated by lighting device 20 (i.e., illuminating light 50 emitted by lighting device 20). Image 70 includes subject 40 and background 42.

[Configuration]

Figure 3:
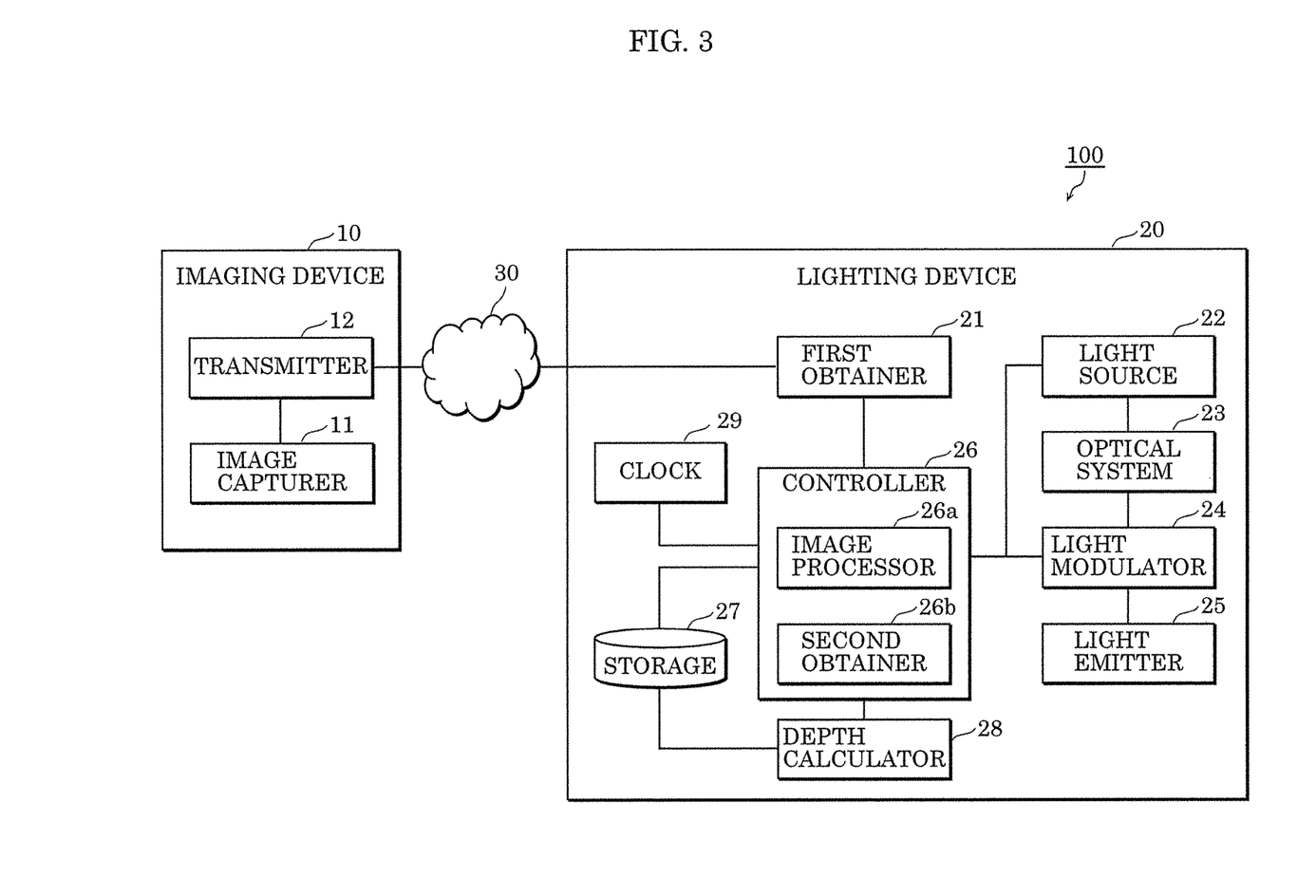
FIG. 3 is a block diagram illustrating a functional configuration of the lighting system according to Embodiment 1.

Next, a configuration of lighting system 100 will be described in detail. FIG. 3 is a block diagram illustrating a functional configuration of lighting system 100 according to Embodiment 1.

As illustrated in FIG. 3, lighting system 100 includes imaging device 10 and lighting device 20. Imaging device 10 and lighting device 20 are connected to each other via communication network 30. Communication network 30 may be any wired or wireless communication network. Communication network 30 is, specifically, a wireless local area network (LAN), a wired LAN, a wide area network (WAN), or the like.

First, imaging device 10 will be described. Imaging device 10 includes image capturer 11 and transmitter 12.

Image capturer 11 is a device for capturing a moving picture. Although subject 40 imaged by image capturer 11 is a tree according to Embodiment 1, subject 40 is not specifically limited. Such a moving picture of the tree is transmitted to lighting device 20, allowing lighting device 20 to perform lighting imitating sunlight filtering through leaves. Image capturer 11 is specifically a charge coupled device (CCD) camera in which a CCD image sensor is used. However, image capturer 11 may be a complementary metal oxide semiconductor (CMOS) camera in which a CMOS image sensor is used, or may be any other type of camera. It should be noted that, although not precisely illustrated in FIG. 3, two image capturers 11 are provided for capturing a stereo image according to Embodiment 1.

Transmitter 12 transmits the moving picture captured by image capturer 11. More specifically, transmitter 12 sequentially transmits images (frames) included in the moving picture captured by image capturer 11. Transmitter 12 is, specifically, a communication module (communication circuit) for a wired communication, or a communication module (communication circuit) for a wireless communication. It should be noted that the standard for communication between transmitter 12 and first obtainer 21 is not specifically limited. When wireless communications are carried out between transmitter 12 and first obtainer 21, a communication standard such as specified low power radio using a frequency according to a radio utilization allocation determined by the government, ZigBee (registered trademark), Bluetooth (registered trademark), Wi-Fi (registered trademark), or the like is used.

Next, lighting device 20 will be described. Lighting device 20 is, for example, a device for indoor lighting, and includes first obtainer 21, light source 22, optical system 23, light modulator 24, light emitter 25, controller 26, storage 27, depth calculator 28, and clock 29. Controller 26 includes image processor 26a and second obtainer 26b.

It should be noted that, in the following description, an image before image processor 26a performs image processing is referred to as a first image. The first image is, stated differently, one image included in the moving picture captured by image capturer 11. In addition, an image after image processor 26a performed image processing is referred to as a second image.

First obtainer 21 obtains a first image which imaging device 10 has generated by imaging subject 40. More specifically, first obtainer 21 is a communication module (communication circuit, in other words, receiving circuit) corresponding to transmitter 12, and sequentially receives first images from transmitter 12. According to Embodiment 1, first obtainer 21 also obtains a third image of subject 40 captured from a different position (at a different angle) from a position at which the first image is captured. The first image and the third image constitute, as it is called, a stereo image, and are used in calculating depth information. It should be noted that it is not essential to obtain the third image.

Light source 22 emits white light. More specifically, light source 22 is a discharge lamp, or a light source in which a solid-state light emitting element such as a light emitting diode (LED), a semiconductor laser, an organic electro luminescence (EL), and inorganic EL are used.

Optical system 23 is for guiding light emitted from light source 22 to light modulator 24. Although optical system 23 is, specifically, a single-plate optical system used in a projector, etc., according to Embodiment 1, optical system 23 may be a three-plate optical system used in a projector, etc. Optical system 23 includes, specifically, optical components such as various lenses (a collimate lens, an integrator lens, a condensing lens, etc.), various mirrors (a reflective mirror or a dichroic mirror), and a polarization beam splitter.

Light modulator 24 modulates light emitted from light source 22, according to the second image resulted from image processing performed on the first image by image processor 26a which will be described later. In other words, light modulator 24 converts light guided by optical system 23 to light modulator 24, into light according to the second image, and outputs the light. Light modulator 24 is, specifically, a transmissive liquid crystal panel. However, light modulator 24 may be a micro mirror array or a reflective liquid crystal panel. It should be noted that, when the three-plate optical system is used as optical system 23, light modulator 24 includes three transmissive liquid crystal panels.

Light emitter 25 emits light which has been modulated. Light emitter 25 is, specifically, a projection lens which projects light onto an object. Controller 26 is a control device which controls: ON and OFF of light source 22; and light modulator 24. Furthermore, controller 26 stores the first image to storage 27. Controller 26 is, specifically, implemented by a processor, a microcomputer, a dedicated circuit, etc.

Controller 26 includes image processor 26a and second obtainer 26b.

Image processor 26a performs image processing on the image obtained by first obtainer 21. Details of the image processing performed by image processor 26a will be described later.

Second obtainer 26b obtains depth information indicating a depth of subject 40 in the first image. According to Embodiment 1, second obtainer 26b obtains depth information calculated by depth calculator 28. It should be noted that, when depth calculator 28 is located outside lighting device 20 and depth information is transmitted via communication network 30 as described later, first obtainer 21 may also serve as second obtainer 26b, and second obtainer 26b may be omitted from controller 26.

In addition, second obtainer 26b may be a memory which obtains and stores therein depth information. Second obtainer 26b may be a memory same as storage 27, or may be a memory different from storage 27.

Storage 27 is a storage device in which the images obtained by first obtainer 21 (the first image and the second image) are temporarily stored (buffered). Storing of the images is performed by controller 26. In addition, a program executed by controller 26 and image processor 26a is also stored in storage 27. Storage 27 is, specifically, implemented by a semiconductor memory, etc.

Depth calculator 28 calculates depth information of subject 40 in the first image, based on the first image and the third image obtained by first obtainer 21. More specifically, depth calculator 28 calculates a depth of subject 40 by performing triangulation, using a distance between a position at which the first image is captured and a position at which the second image is captured, a focal length of image capturer 11 for the first image, an amount of a position gap in the horizontal direction between feature points corresponding to the first image and the third image. The depth information is, specifically, a depth image (a depth map) or the like corresponding to the first image. However, the depth information may be any information as long as the depth information indicates a depth of subject 40. A pixel included in the depth image indicates a depth value.

In this case, depth calculator 28 is, specifically, implemented by a processor, a microcomputer, a dedicated circuit, etc. The distance between the position at which the first image is captured and the position at which the second image is captured, and the focal length of image capturer 11 for the first image are stored in storage 27 in advance.

It should be noted that the method of calculating depth information is not specifically limited. For example, depth calculator 28 may calculate the depth information using a depth from defocus (DFD) method.

In addition, depth calculator 28 is not an indispensable structural component, and an external device different from lighting device 20 may include depth calculator 28. The external device described here is imaging device 10, for example.

Depth calculator 28 included in imaging device 10 may calculate the depth information using the above-described triangulation or DFD method, or may calculate the depth information using a time of flight (TOF) method. When the TOF method is used, depth calculator 28 is, specifically, a TOF sensor.

Clock 29 is a time keeping device which keeps track of the current time including year, month, and day. Clock 29 is, specifically, a real-time clock IC or the like. However, clock 29 may be implemented in any manner.

[Operation of Lighting Device]

Figure 4:
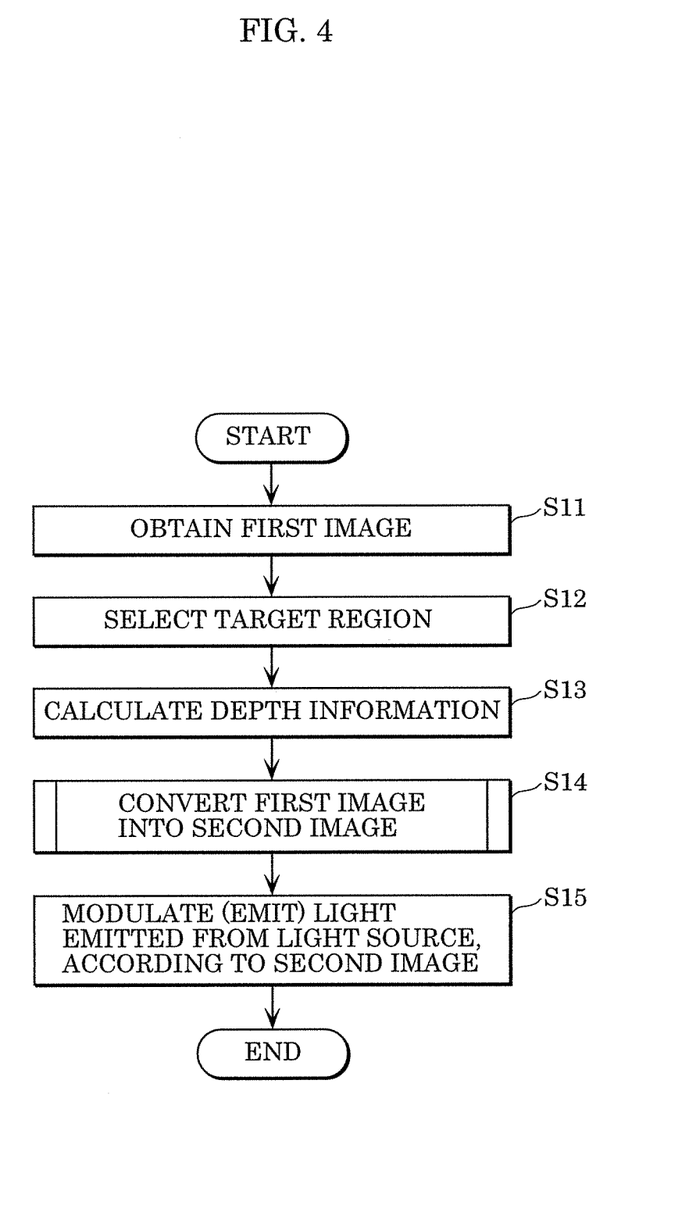
FIG. 4 is a flowchart illustrating an operation of the lighting device according to Embodiment 1.

Next, an operation of lighting device 20 will be described. FIG. 4 is a flowchart of an operation of lighting device 20.

First obtainer 21 of lighting device 20 obtains a first image which imaging device 10 has generated by imaging subject 40 (S11). It should be noted that a third image is also obtained in addition to the first image, according to Embodiment 1.

Next, image processor 26a selects a target region for image processing in the first image (S12). A user specifies the target region using a user interface such as a remote controller (not illustrated in FIG. 3) included in lighting device 20. It should be noted that selecting of the target region is not indispensable, and the first image as a whole may be treated as the target region. In the description below, the target region of the first image selected by image processor 26a is also referred to as the first image.

Next, depth calculator 28 calculates depth information indicating a depth of subject 40 in the first image, based on the first image and the third image obtained by first obtainer 21 (S13). Second obtainer 26b obtains the depth information calculated by depth calculator 28.

Next, image processor 26a performs, on the first image, image processing based on the first image obtained and the depth information obtained, thereby generating a second image. In other words, image processor 26a converts the first image into the second image (S14).

Finally, light modulator 24 modulates, according to the second image, light emitted from the light source, and light emitter 25 emits the light which has been modulated (S15).

[Image Processing of Image Processor]

Figure 5:
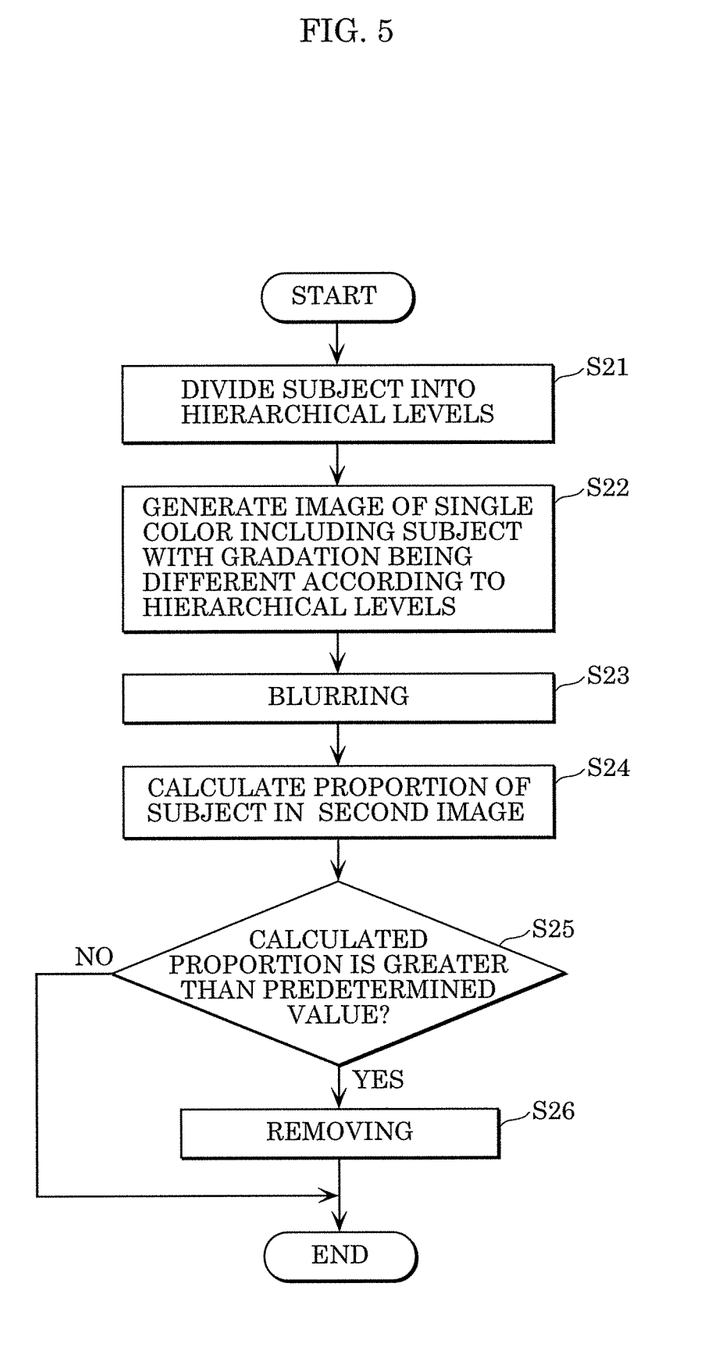
FIG. 5 is a flowchart of an image processing performed by an image processor.

Next, image processing performed by image processor 26a will be described. FIG. 5 is a flowchart of the image processing performed by image processor 26a.

Figure 6:
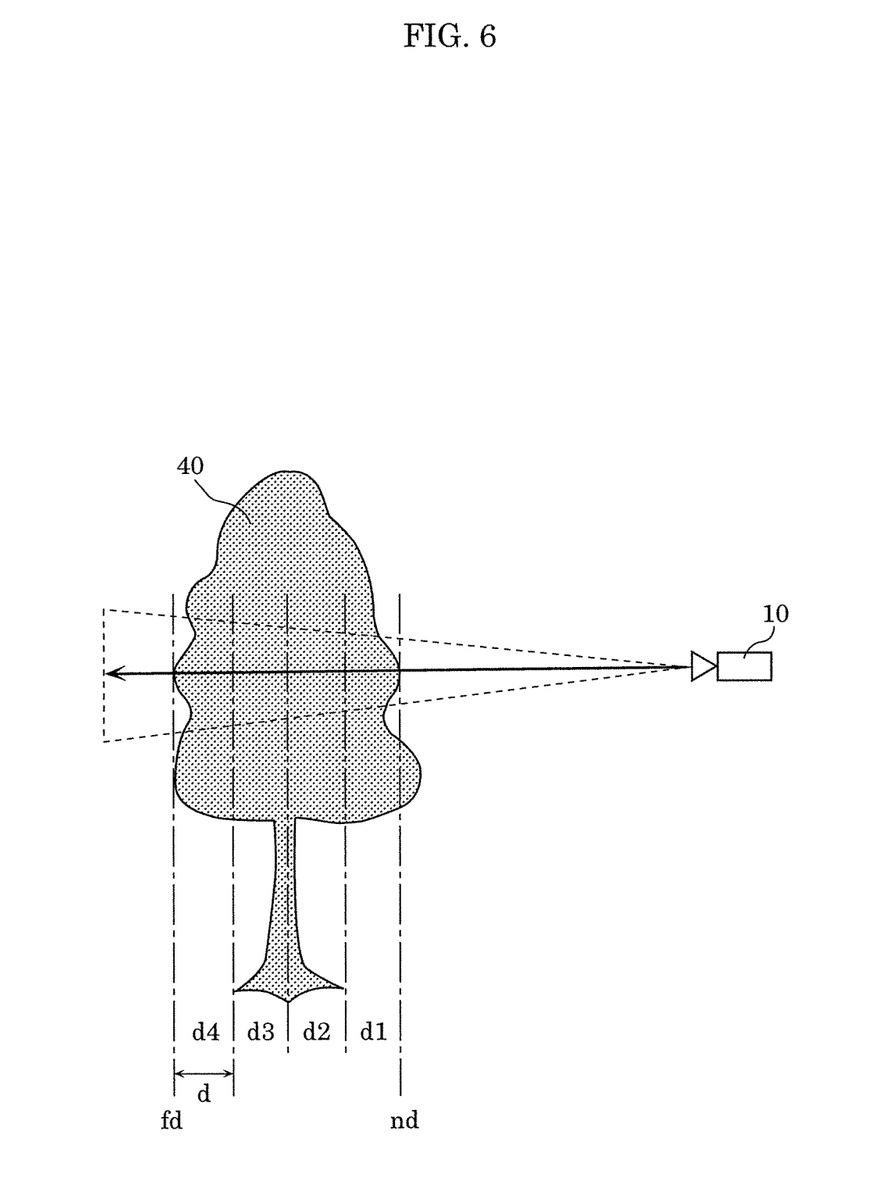
FIG. 6 is a schematic diagram for explaining dividing of a subject into levels in a hierarchy.

First, image processor 26a divides subject 40 in the first image into hierarchical levels by a predetermined depth, based on the depth information obtained by second obtainer 26b (S21). FIG. 6 is a schematic diagram for explaining dividing of subject 40 into hierarchical levels.

As illustrated in an example of FIG. 6, when the first image is generated as a result of imaging subject 40 by imaging device 10, image processor 26a identifies most adjacent portion nd and least adjacent portion fd of subject 40 in the first image, based on the depth information. Then, image processor 26a divides a distance from least adjacent portion fd to most adjacent portion nd into hierarchical levels by predetermined depth d. Predetermined depth d is determined by dividing the distance from least adjacent portion fd to most adjacent portion nd by the number of the hierarchical levels (four in the example illustrated in FIG. 6). As a result, from most adjacent portion nd toward least adjacent portion fd, four hierarchical levels of hierarchical level d1, hierarchical level d2, hierarchical level d3, and hierarchical level d4 are generated. It should be noted that the number of hierarchical levels and predetermined depth d are not specifically limited.

It should be noted that image processor 26a specifies, as background 42, a region in the first image which is determined to be more adjacent than most adjacent portion nd and a region in the first image that is determined to be less adjacent than least adjacent portion fd.

Figure 7:
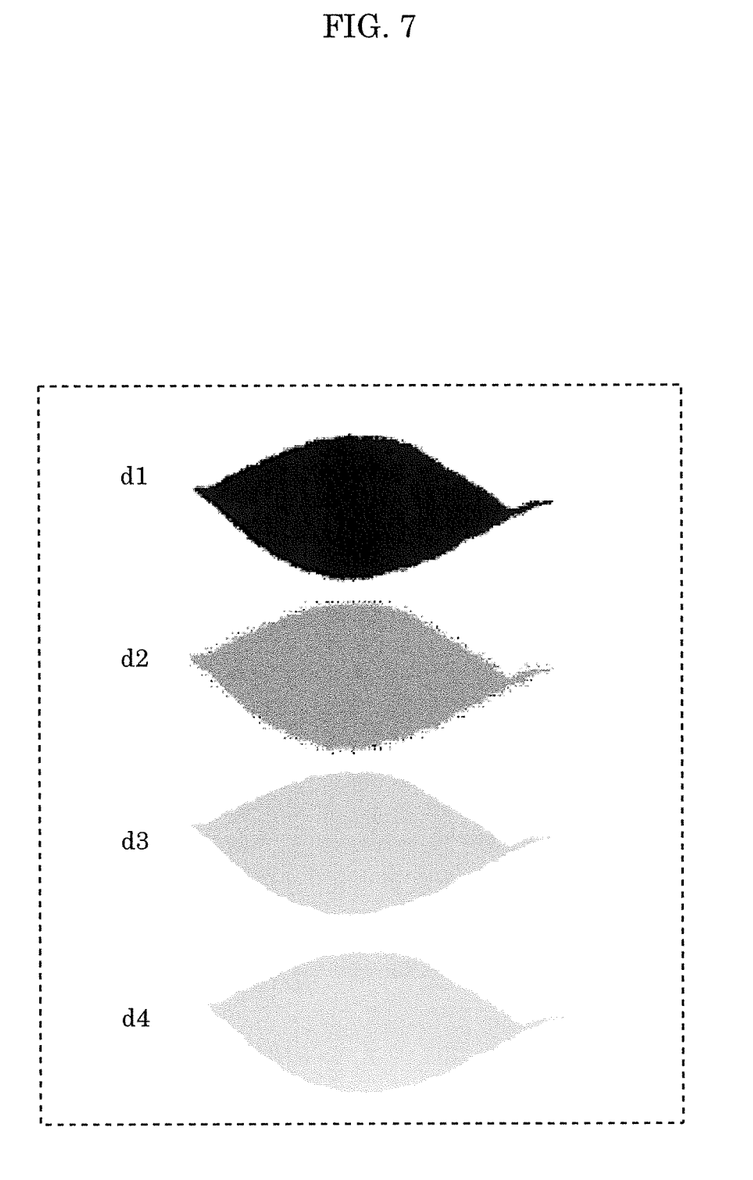
FIG. 7 is a diagram for explaining processing of converting a first image into a second image.

Next, image processor 26a generates a second image that is an image of a single color including subject 40 with the gradation being different according to the hierarchical levels (S22). It should be noted that the term "gradation" described here refers to different levels of color density of the single color. Image processor 26a converts the first image obtained into the second image in which the gradation of the single color of subject 40 in the first image is different according to the hierarchical levels. In other words, image processor 26a converts the obtained first image into the second image in which subject 40 in the first image is represented by the gradation of a single color, and the gradation is different according to the depth indicated by the depth information. FIG. 7 is a diagram for explaining processing of converting the first image into the second image. In FIG. 7, leaves of a tree which are portions of subject 40 are exemplified.

As illustrated in FIG. 7, image processor 26a assigns a gray color to a portion (pixel) of subject 40 in the first image such that the gray color increases in color density as the depth of the hierarchical level of the portion increases. For example, among portions of subject 40 in the first image, the portion which belongs to hierarchical level d1 that is the least in depth is assigned with a black color or a gray color close to black. Among the portions of subject 40 in the first image, the portion which belongs to hierarchical level d4 that is the greatest in depth is assigned with a gray color close to white. Background 42 is assigned with a white color.

It should be noted that the level of color density assigned to each of the hierarchical levels may be determined based on a control program stored in storage 27. In addition, a correspondence relationship between each of the hierarchical levels and a level of color density assigned to a portion that belongs to each of the hierarchical levels may be stored in storage 27, and the level of color density assigned to each of the hierarchical levels may be determined based on such a correspondence relationship.

Furthermore, the second image may be any image as long as the second image is represented by gradation of a single color, and may be, for example, an image represented by gradation of a blue color (bluish color).

Figure 8:
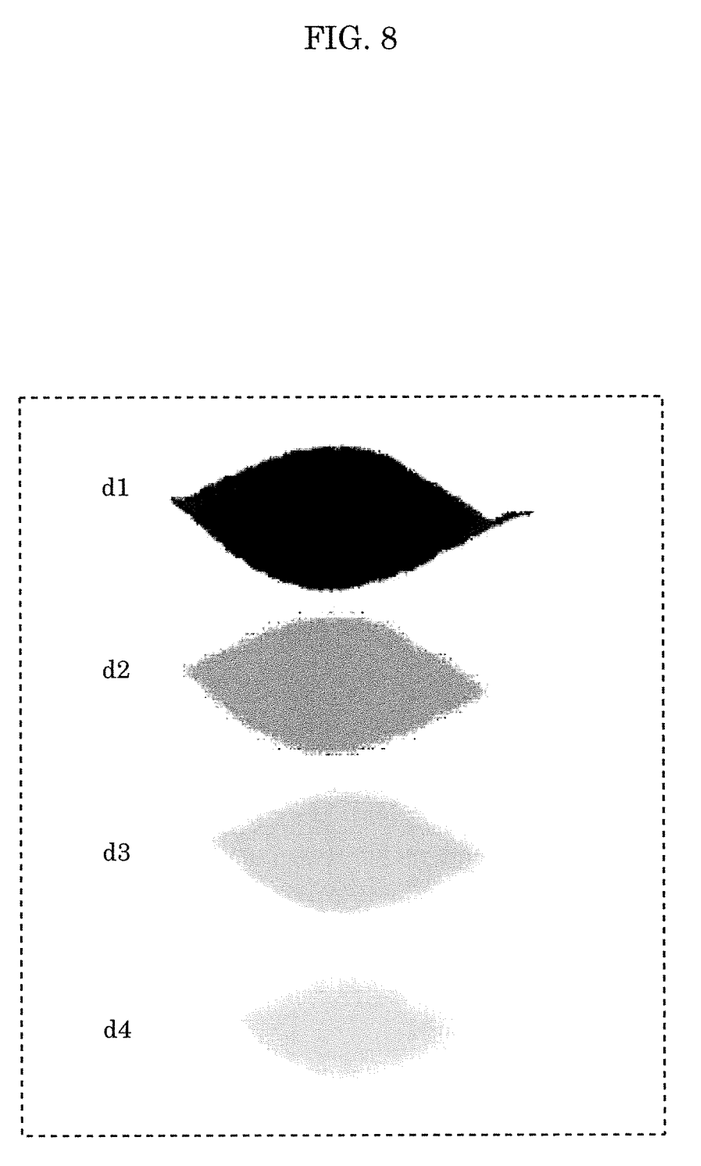
FIG. 8 is a diagram for explaining blurring.

Next, image processor 26a blurs subject 40 in the second image according to the depth indicated by the depth information (S23). FIG. 8 is a diagram for explaining blurring. In FIG. 8, leaves of a tree which are portions of subject 40 are exemplified.

As illustrated in FIG. 8, image processor 26a blurs a portion (pixel) of subject 40 in the first image such that the degree of blurring increases as the depth of the hierarchical level of the portion increases. For example, among portions of subject 40 in the first image, the portion which belongs to hierarchical level d1 that is the least in depth is not blurred or blurred only slightly. Among the portions of subject 40 in the first image, the portion which belongs to hierarchical level d4 that is the greatest in depth is blurred heavily.

It should be noted that blurring is a process of, for example, assigning a white color to background 42 and changing the color of a target pixel to be processed into an average color of the color of the target pixel and colors of pixels surrounding the target pixel. In this case, the degree of blurring is increased by increasing the number of the surrounding pixels when calculating the average of colors. The above-described process of blurring is an example, and any existing process of blurring may be performed in Step S23.

Figure 9:
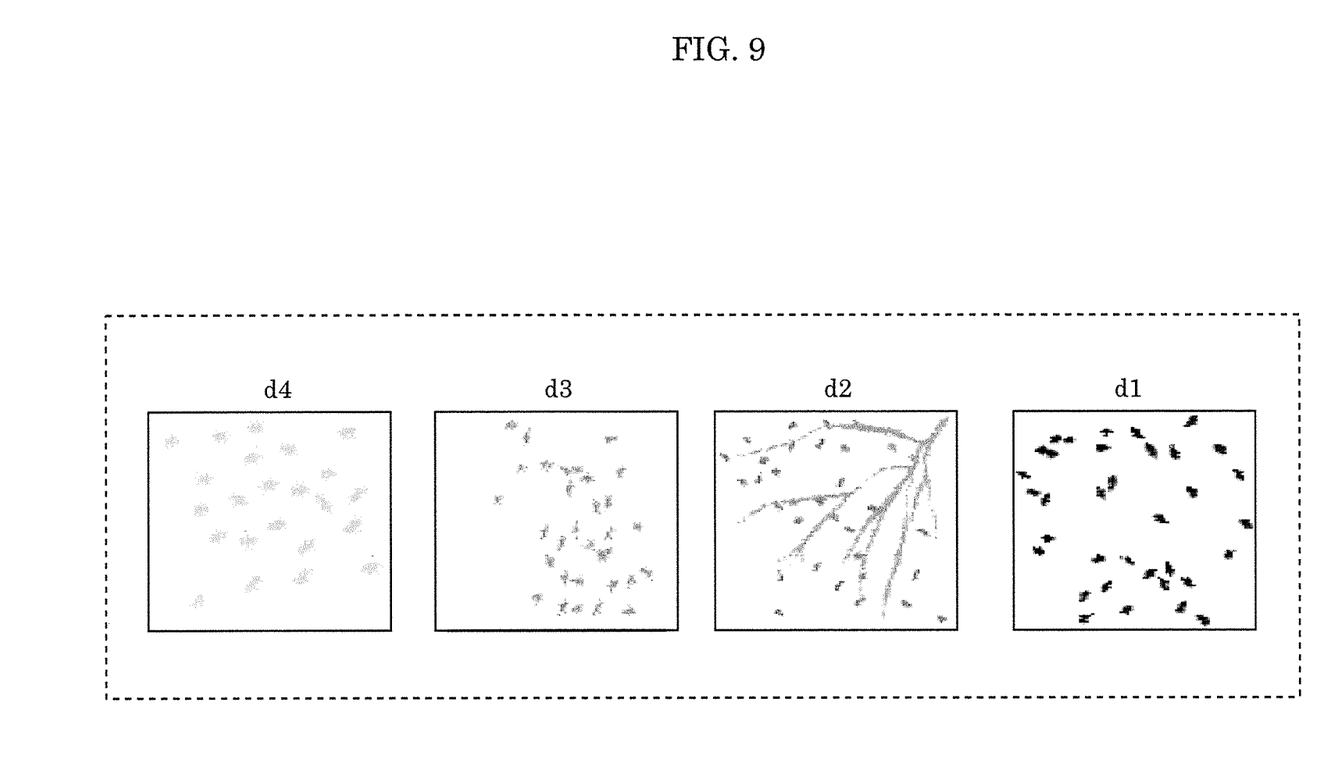
FIG. 9 is a diagram illustrating, for each of the levels in the hierarchy, the second image which has been blurred.

FIG. 9 is a diagram illustrating, in different hierarchical levels, the second image obtained through the above-described Step S22 and Step S23, The second image in which the images in different hierarchical levels as illustrated in FIG. 9 are synthesized (superimposed) is image 70 illustrated in FIG. 2 described above.

Figure 10:
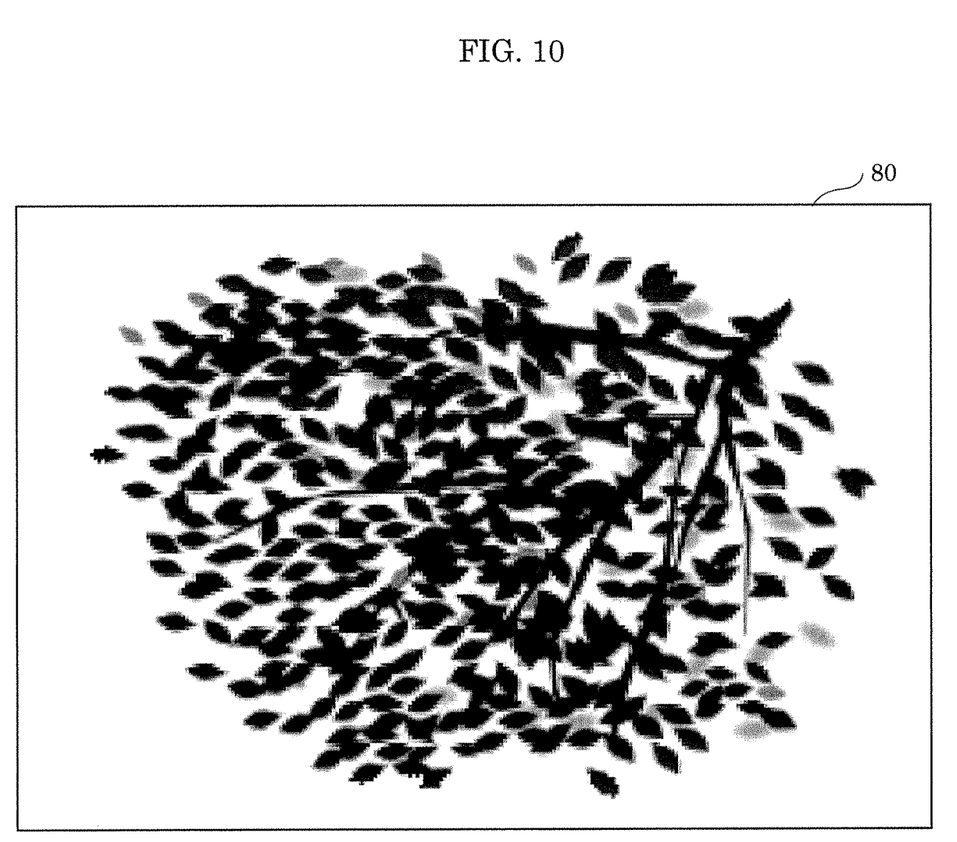
FIG. 10 is a diagram illustrating another example of the second image.

When a region having a black color or a gray color close to black increases as in second image 80 illustrated in FIG. 10, a dark portion increase in light emitted by lighting device 20. FIG. 10 is a diagram illustrating another example of the second image. Light with a large dark portion, in some cases, is not suitable for illumination.

In view of the above, image processor 26a calculates a proportion of subject 40 in an entirety of the second image (S24), and determines whether or not the calculated proportion is greater than a predetermined value (S25). Although the predetermined value is 50% according to Embodiment 1, the predetermined value is not specifically limited. The above-described predetermined value is, for example, an arbitrary value in a range from 10% to 90%, inclusive. It should be noted that the predetermined value may be changed by a user via a user interface included in lighting device 20.

When the calculated proportion is greater than the predetermined value (Yes in S25), image processor 26a removes a portion of subject 40 in the second image, by assigning the same color as a color of background 42 to the portion of subject 40 in the second image (S26). More specifically, image processor 26a identifies an outline of a leaf that belongs to hierarchical level d1 of subject 40 in the second image by an edge detection based on a luminance change in the second image, and randomly assigns a color same as the color of background 42 to a region surrounded by the identified outline. In this manner, the leaf which belongs to hierarchical level d1 is removed. With this, it is possible to increase a bright portion in light emitted by lighting device 20.

When the calculate proportion is less than the predetermined value (No in S25), image processor 26a ends the image processing.

The image processing performed by image processor 26a has been described above. It should be noted that the steps and the order of the steps illustrated in the flowchart of FIG. 5 are examples. The process of Step S23 and the processes after Step S23 may be omitted. In addition, Step S24 to Step S26, for example, may be performed between Step S22 and Step S23.

Furthermore, although image processor 26a assigns a gray color to a portion of subject 40 in the first image such that the gray color increases in color density as the depth of the hierarchical level of the portion increases in Step S22 described above, image processor 26a may assign a gray color to a portion of subject 40 in the first image such that the gray color decreases in color density as the depth of the hierarchical level of the portion increases. In addition, although image processor 26a blurs a portion of subject 40 in the first image such that the degree of blurring increases as the depth of the hierarchical level of the portion increases in Step S23 described above, image processor 26a may blur the portion of subject 40 in the first image such that the degree of blurring decreases as the depth of the hierarchical level of the portion increases.

[Modification 1]

Although image processor 26a assigns a white color to background 42 that is a portion of the second image other than subject 40 according to Embodiment 1, image processor 26a may assign a single color (white color) on a black body locus in chromaticity coordinates to background 42.

Figure 11:
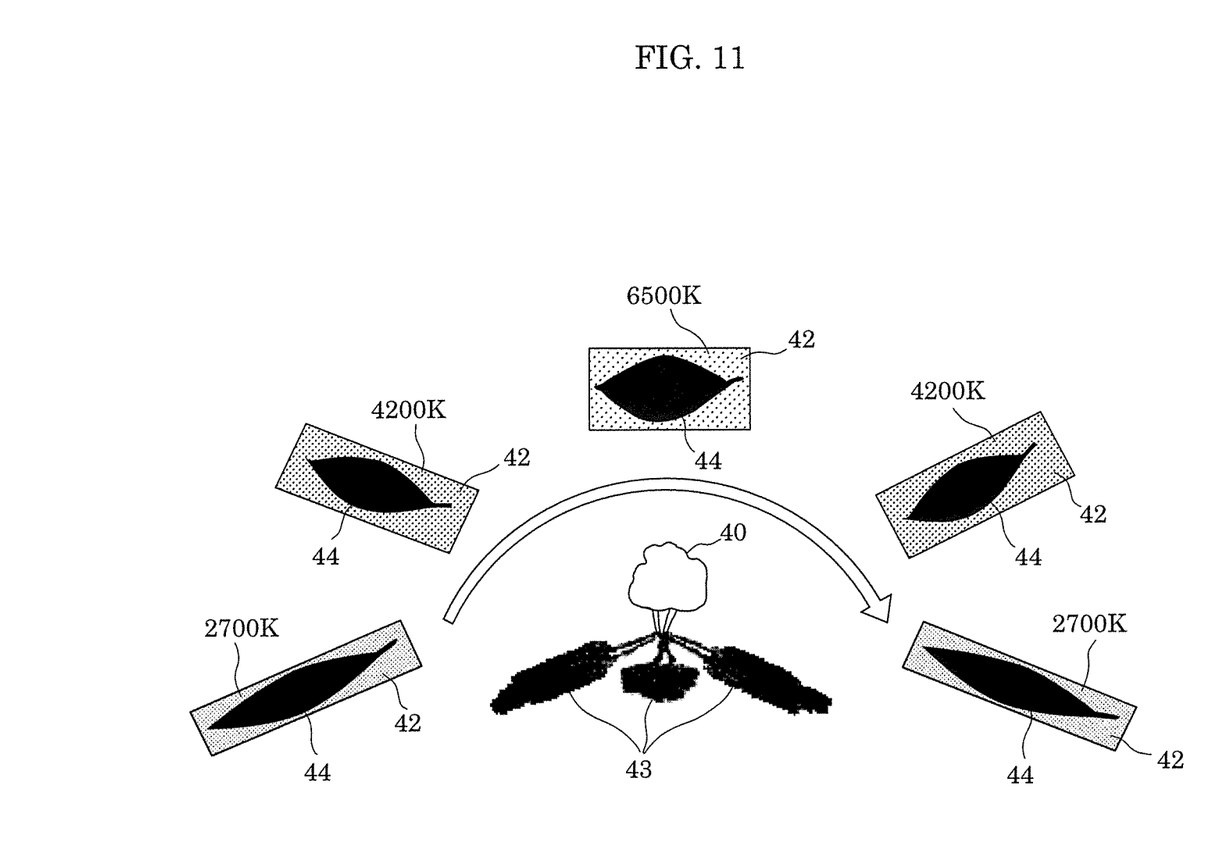
FIG. 11 is a diagram for explaining image processing according to time, which is performed by the image processor.

In addition, image processor 26a may vary the single color of background 42 on the black body locus in the chromaticity coordinates, according to the time kept by clock 29, for example. In other words, image processor 26a may vary a color temperature of background 42 according to time. FIG. 11 is a diagram for explaining image processing according to time, which is performed by image processor 26a.

As illustrated in FIG. 11, a color temperature of sunlight changes according to time of the day. More specifically, the color temperature of sunlight is low in the morning and in the late afternoon, and high around noon. Here, light emitted by lighting device 20 is light imitating sunlight filtering through leaves, and thus image processor 26a may vary the color temperature of background 42 according to time. Image processor 26a may decrease the color temperature of background 42 to approximately 2700 K in a time zone in the morning and in the late afternoon, and increase the color temperature of background 42 to approximately 6500 K in the daytime. In this manner, it is possible to cause the light emitted by lighting device 20 to have an atmosphere more closely resembling sunlight.

Light source 22, for example, includes two or more types of light emitting elements having different color temperatures, and controller 26 controls light emission of the two or more types of light emitting elements, thereby allowing the color temperature to be varied. Alternatively, controller 26 may control light modulator 24 (i.e., may control output of RGB emitted from light modulator 24 to light emitter 25), thereby allowing the color temperature to be varied.

In addition, the color temperature can be varied according to time, when a correspondence relationship between time and a color temperature, for example, is stored in storage 27. Image processor 26a is capable of varying the color temperature of background 42, by checking the time kept by clock 29 and the above-described correspondence relationship.

[Modification 2]

In addition, when subject 40 is a tree, an extending direction of shadow 43 of subject 40 (tree) illustrated in FIG. 11 differs according to a time zone (time point) of the day. As described above, light emitted by lighting device 20 is light imitating sunlight filtering through leaves between such shadows of the tree. Thus, as illustrated in FIG. 11, image processor 26a may, for example, change the shape of at least a portion of subject 40 in the second image according to the time kept by clock 29. It should be noted that the portion of subject 40 is, for example, leaf 44 of the tree, and changing of the shape includes, in this case, rotation, and enlargement or reduction. Leaf 44 in the second image is identified, using an existing method such as the edge detection based on the luminance change in the second image, and pattern matching.

With this, it is possible to cause the light emitted by lighting device 20 to have an atmosphere more closely resembling sunlight.

Such changing of the shape of subject 40 in the second image can be implemented when, for example, a correspondence relationship between the time and an amount of rotation, an amount of enlargement or reduction, or an amount of change in a direction of enlargement or reduction is stored in storage 27. Image processor 26a is capable of changing the shape of leaf 44 in the second image, by checking the time kept by clock 29 and the above-described correspondence relationship.

[Modification 3]

In addition, lighting system 100 may include a wind velocity measurement device (not shown) capable of communicating via communication network 30. The wind velocity measurement device is, for example, located close to imaging device 10, or close to subject 40 which is imaged by imaging device 10.

First obtainer 21 of lighting device 20 may obtain wind velocity information indicating a wind velocity at a location adjacent to the wind velocity measurement device, from the wind velocity measurement device located as described above, and image processor 26a may perform processing of emphasizing swing of subject 40 in the second image according to the obtained wind velocity information.

Movement of subject 40 caused by wind is reflected in the second image, i.e., in the light emitted by lighting device 20. With the above-described processing of emphasizing swing of subject 40, the swing of subject 40 is reflected in the second image with more exaggeration. Image processor 26a more strongly emphasizes the swing as the obtained wind velocity information indicates a higher wind velocity.

Image processor 26a, for example, calculates a motion vector of subject 40 between two temporally consecutive second images stored temporarily in storage 27. Image processor 26a is capable of emphasizing the swing by further moving the position of subject 40 in the moving direction of subject 40 determined by the calculated motion vector, in the temporally latter second image of the two second images. It should be noted that such processing is an example, and image processor 26a may emphasize the swing of subject 40 in the second image using other methods.

With the processing described above, it is possible to reflect the swing of subject 40 with an emphasis, in the light emitted by lighting device 20.

[Advantageous Effects, etc.]

As described above, lighting device 20 includes: first obtainer 21 which obtains a first image which imaging device 10 has generated by imaging subject 40; second obtainer 26b which obtains depth information indicating a depth of subject 40 in the first image; image processor 26a which converts the first image obtained, into a second image in which subject 40 in the first image is represented by gradation of a single color, the gradation being different according to the depth indicated by the depth information. Lighting device 20 includes: light source 22; light modulator 24 which modulates light emitted from light source 22, according to the second image; and light emitter 25 which emits the light modulated.

With this configuration, lighting device 20 is capable of emitting light which has a feature of subject 40 imaged by imaging device 10, and is suitable for room illumination. In other words, lighting device 20 is capable of generating light suitable for illumination, using an image.

In addition, image processor 26a either one of increases and decreases color density of the single color of a portion of subject 40 in the first image as a depth of the portion indicated by the depth information increases.

In this manner, lighting device 20 is capable of emitting light including subject 40 in which color density is decreased as a depth increases, or emitting light including subject 40 in which the color density is increased as the depth increases.

In addition, image processor 26a blurs subject 40 in the second image according to the depth indicated by the depth information.

In this manner, lighting device 20 is capable of emitting light including subject 40 blurred according to the depth.

In addition, image processor 26a either one of increases and decreases a degree of blurring of a portion of subject 40 in the first image as a depth of the portion indicated by the depth information increases.

In this manner, lighting device 20 is capable of emitting light including subject 40 in which the degree of blurring is increased as the depth increases, or emitting light including subject 40 in which the degree of blurring is increased as the depth increases.

In addition, subject 40 in the second image is represented in gray scale.

In this manner, lighting device 20 is capable of emitting light including subject 40 represented in gray scale.

In addition, image processor 26a divides subject 40 in the first image into hierarchical levels by a predetermined depth, based on the depth information, and converts the first image into the second image in which the gradation of the single color of subject 40 in the first image differs according to the hierarchical levels.

In this manner, lighting device 20 is capable of emitting light including subject 40 in which the gradation differs according to the hierarchical levels.

In addition, image processor 26a assigns a single color on a black body locus in chromaticity coordinates to a background that is a portion other than subject 40 in the second image.

In this manner, lighting device 20 is capable of emitting light that includes subject 40 and background 42 of subject 40 which has a single color on a black body locus in chromaticity coordinates.

In addition, lighting device 20 further includes clock 29 which keeps time. Image processor 26a varies the single color of the background on the black body locus in the chromaticity coordinates, according to the time kept by clock 29.

In this manner, lighting device 20 is capable of emitting light including background 42 that has a color temperature varied according to time as with sunlight.

In addition, image processor 26a calculates a proportion of subject 40 in an entirety of the second image, and when the proportion calculated is greater than a predetermined value, removes a portion of subject 40 in the second image by assigning a color of a background that is a portion other than subject 40 in the second image to the portion of subject 40 in the second image.

In this manner, lighting device 20 is capable of emitting light in which a proportion of subject 40 and background 42 is adjusted.

In addition, lighting device 20 may further includes a clock which keeps time, and image processor 26a changes a shape of at least a portion of subject 40 in the second image, according to the time kept by clock 29.

In this manner, lighting device 20 is capable of emitting light including subject 40 having a shape that partly changes according to time, as with the shadow of subject 40 outside.

In addition, lighting system 100 includes: lighting device 20 and imaging device 10.

With this configuration, lighting system 100 is capable of emitting light which has a feature of subject 40 imaged by imaging device 10, and is suitable for room illumination. In other words, lighting system 100 is capable of generating light suitable for illumination, using a moving picture.

Other Embodiment

Although the embodiment has been described above, the present disclosure is not limited to the above-described embodiment.

For example, a tree is used as a subject in the above-described embodiment. However, other landscape or the like may be used as a subject. The subject, for example, includes a portion having a distance to the imaging device which is different from a distance between other portions and the imaging device (i.e., having convex and concave when viewed from the imaging device).

In addition, the optical system described in the above-described embodiment is an example, and any optical system may be employed in the lighting device. For example, when a blue LED or a blue laser is employed as a light source of the lighting device, an optical system including a phosphor wheel may be employed.

Furthermore, in the above-described embodiment, each of the structural components such as the controller and the image processor may be configured in the form of an exclusive hardware product, or may be realized by executing a software program suitable for the structural components. Each of the structural components may be realized by means of a program executing unit, such as a CPU and a processor, reading and executing the software program recorded on a recording medium such as a hard disk or a semiconductor memory.

In addition, each of the structural components may be a circuit (or an integrated circuit). The circuitries may be configured as a single circuitry as a whole or may be mutually different circuitries. In addition, the circuitries may each be a general-purpose circuit, or may be a dedicated circuit.

In addition, these general and specific aspects of the present disclosure may be implemented using a system, a device, a method, an integrated circuit, a computer program, or a non-transitory computer-readable recording medium such as a compact disc read only memory (CD-ROM), or any combination of systems, devices, methods, integrated circuits, computer programs, or non-transitory computer-readable recording media. For example, the present disclosure may be implemented as an image processing method performed by the image processor included in the lighting device. In addition, the present disclosure may be implemented as a program for causing a computer to execute processes performed by the image processor included in the lighting device.

Moreover, the processing order of the processes of the operation performed by the lighting device described in the above-described embodiment is an example. The processing order of the processes may be changed, or may be performed in parallel.

Moreover, embodiments obtained through various modifications to the respective embodiments which may be conceived by a person skilled in the art as well as embodiments realized by arbitrarily combining the structural components and functions of the respective embodiments without materially departing from the spirit of the present disclosure are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A lighting device, comprising:
 a receiving circuit which obtains a first image including a subject;
 a memory which obtains depth information indicating a depth of the subject in the first image;
 an image processor which converts the first image obtained, into a second image in which the subject in the first image is represented by gradation of a single color, the gradation being different according to the depth indicated by the depth information;
a light source;
a light modulator which modulates light emitted from the light source, according to the second image; and
a light emitter which illuminates a room by emitting the modulated light,
wherein the image processor
  calculates a proportion of the subject in an entirety of the second image, and
  when the proportion calculated is greater than a predetermined value, removes a portion of the subject in the second image by assigning a color of a background that is a portion other than the subject in the second image to the portion of the subject in the second image.

2. The lighting device according to claim 1, wherein the image processor either one of increases and decreases color density of the single color of a portion of the subject in the first image as a depth of the portion indicated by the depth information increases.

3. The lighting device according to claim 1, wherein the image processor blurs the subject in the second image according to the depth indicated by the depth information.

4. The lighting device according to claim 3, wherein the image processor either one of increases and decreases a degree of blurring of a portion of the subject in the first image as a depth of the portion indicated by the depth information increases.

5. The lighting device according to claim 1, wherein the subject in the second image is represented in gray scale.

6. A lighting device, comprising:
a receiving circuit which obtains a first image including a subject;
a memory which obtains depth information indicating a depth of the subject in the first image;
an image processor which converts the first image obtained, into a second image in which the subject in the first image is represented by gradation of a single color, the gradation being different according to the depth indicted by the depth information;
a light source;
a light modulator which modulates light emitted from the light source, according to the second image; and
a light emitter which emits the modulated light, wherein the image processor
  divides the subject in the first image into hierarchical levels by a predetermined depth, based on the depth information,
  converts the first image into the second image in which the gradation of the single color of the subject in the first image differs according to the hierarchical levels,
  calculates a proportion of the subject in an entirety of the second image, and
  when the proportion calculated is greater than a predetermined value, removes a portion of the subject in the second image by assigning a color of a background that is a portion other than the subject in the second image to the portion of the subject in the second image.

7. The lighting device according to claim 1, wherein the image processor assigns a single color on a black body locus in chromaticity coordinates to a background that is a portion other than the subject in the second image.

8. The lighting device according to claim 7, further comprising
a clock which keeps time, wherein
the image processor varies the single color of the background on the black body locus in the chromaticity coordinates, according to the time kept by the clock.

9. The lighting device according to claim 1, further comprising
a clock which keeps time, wherein
the image processor changes a shape of at least a portion of the subject in the second image, according to the time kept by the clock.

10. A lighting system, comprising:
the lighting device according to claim 1; and
an imaging device.

11. A non-transitory computer-readable recording medium for use in a computer, the recording medium having a computer program recorded thereon for causing the computer to execute processes performed by the image processor included in the lighting device according to claim 1.

* * * * *